United States Patent
Timmons et al.

(10) Patent No.: US 6,733,878 B2
(45) Date of Patent: May 11, 2004

(54) THERMALLY ACTUATED FOIL-LESS BINDER TAPE FOR BOOKS

(75) Inventors: Thomas C. Timmons, Penfield, NY (US); Ralph M. Palazzolo, Yukon, OK (US); Carla D. Jackson, Edmond, OK (US); Rainer W. Alba, Yukon, OH (US); Gary E. Fincher, Yukon, OK (US); David A. Eck, Oklahoma City, OK (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/012,424

(22) Filed: Dec. 12, 2001

(65) Prior Publication Data

US 2003/0108737 A1 Jun. 12, 2003

(51) Int. Cl.[7] .................................................. B42D 1/00
(52) U.S. Cl. ........................ 428/354; 428/347; 428/349; 428/189
(58) Field of Search ............................... 428/354, 347, 428/349, 189

(56) References Cited

U.S. PATENT DOCUMENTS

| | | | |
|---|---|---|---|
| 5,006,396 A | 4/1991 | VanBortel et al. | 428/189 |
| 5,174,556 A | 12/1992 | Taylor et al. | 270/1.1 |
| 5,213,871 A | 5/1993 | VanBortel et al. | 428/189 |
| 6,444,308 B1 * | 9/2002 | Ferrante | 428/349 |

* cited by examiner

Primary Examiner—Daniel Zirker
(74) Attorney, Agent, or Firm—Fay, Sharpe, Fagan, Minnich & Mckee, LLP

(57) ABSTRACT

A foil-less binding tape is provided. The binding tape includes a coated backing strip, a first hot melt spine adhesive stripe coated on a coated side of the backing strip, wherein the first hot melt adhesive stripe is located away from the edges of the strip and the first hot melt adhesive stripe runs substantially from one end of the strip to the other end of the strip about the long axis of the strip; and at least two second hot melt flap adhesive stripes coated on a coated side of the backing strip wherein the second adhesive stripes are located in areas other than those covered by the first adhesive stripe.

18 Claims, 1 Drawing Sheet

THERMALLY ACTUATED FOIL-LESS BINDER TAPE FOR BOOKS

BACKGROUND OF THE INVENTION

1. Field of Invention

The present invention is generally directed to a binding article and composition and binding processes thereof. More specifically, the present invention relates to improved binding tapes and binding processes for use, for example, in binding devices and binding operations in printing and copying machines. The binding tapes of the present invention do not require a foil moisture barrier and thereby provide a number of advantages over other binding compositions, articles, and automated binding processes.

2. Description of Related Art

Attention is directed to commonly owned and assigned U.S. Pat. Nos. 5,006,396, issued Apr. 9, 1991, to VanBortel et al., entitled "MOISTURE PROOF THERMALLY ACTUATED BINDING TAPE FOR BOOKS," wherein there is disclosed a moisture proof binding tape for edge binding pages to form a book comprising a non-permeable temperature resistant foil layer covering one side of the backing strip forming a moisture barrier, a high temperature steam resistant adhesive between the foil layer and the backing strip to secure the foil layer to the backing strip, and a relatively thick central stripe of low tack heat activated adhesive flanked by relatively thin side stripes of high tack heat activated adhesive on the foil layer; U.S. Pat. No. 5,213,871, issued May 25, 1993, to VanBortel et al., entitled "MOISTURE PROOF THERMALLY ACTUATED BINDING TAPE FOR BOOKS," wherein there is disclosed a moisture proof binding tape for edge binding pages to form a book comprising a non-permeable temperature resistant foil layer covering one side of the backing strip forming a moisture barrier, a high temperature steam resistance adhesive between the foil layer and the backing strip to secure the foil layer to the backing strip, and a relatively thick central stripe of high tack heat activated adhesive flanked by relatively thin side stripes of low tack heat activated adhesive on the foil layer, the central adhesive stripe comprising a non-hygroscopic adhesive; and U.S. Pat. No. 5,174,556, issued Dec. 29, 1992, to Taylor et al., entitled "FINISHER WITH BINDER PRINTING," wherein there is disclosed a document finisher that includes a printing station for printing on the binding of a book, in one embodiment a printing station prints on the binder tape before the book is bound, and in a second embodiment the printer prints on the binding after the book is bound, and the printing stations are space efficient and designed to be easily incorporated with preexisting stations in document finishers, and wherein ink jet printers and impact-type printers may be utilized.

As described in U.S. Pat. No. 5,006,396 to "Moisture Proof Thermally Actuated Binding Tape for Books", issued Apr. 9, 1991, to VanBortel et al., the disclosure of which is herein incorporated by reference, a popular method of binding pages together permanently to form a 'Perfect Bound' book, pamphlet, or the like, uses a binding strip or tape with heat activated adhesive. As discussed more fully in the aforecited VanBortel et al patent, moisture tends to accumulate in the paper backing strip of the binding tape. During the binding process, when heat and pressure are applied, the moisture vaporizes to form steam. The steam rises into the adhesives in the form of bubbles. When the binding process is completed, the steam is trapped in the adhesive, resulting in a degraded and poor bind. The Van-Bortel et al., patent addressed this problem by placing an impervious moisture proof layer such as aluminum foil between the binding tape backing and the adhesives, thereby preventing any steam created through heating of the binding strip from passing upwardly from the backing strip into the strip adhesives. It has been found, however, that moisture may also accumulate in and thus be present in the adhesives themselves, particularly in the relatively thick spine adhesive. When this occurs, the moisture is turned to steam by heat from the binding process, forming bubbles in the adhesive. On cooling of the adhesive, following completion of the binding process, the bubbles remain, resulting in a weakened and unreliable binding.

The disclosure of each of the above mentioned patent applications are incorporated herein by reference in their entirety. The appropriate components and processes of those patent applications may be selected for the products and processes of the present invention in embodiments thereof.

SUMMARY OF THE INVENTION

It is a feature of the present invention to provide an improved moisture proof thermally actuated binding tape for application to the spine of a book to bind the pages together that comprise the book, the tape having a backing strip with at least one stripe of high tack hot melt adhesive on the tape and a layer of non-permeable moisture resistant barrier material between the backing strip and the adhesive stripe to prevent transfer of moisture in the form of steam from the backing strip to the adhesive stripe on application of heat to the tape, application of heat to the tape actuating the adhesive to form a bond between the tape and the book spine, in which the stripe of high tack hot melt adhesive comprises a substantially non-hygroscopic adhesive material to obviate the accumulation of moisture by the adhesive material and the generation of undesirable steam on application of heat to the tape during binding.

It is another feature of the present invention to provide a simple and economical binding processes for the binding multi-page documents which are produced, for example, in modern electrophotographic, ionographic, ink jet, and the like print engines and processes.

The present invention in embodiments provides a binding tape for application to the spine of a book to bind pages of said book together, the tape comprising;

a coated backing strip;

a first hot melt spine adhesive stripe coated on a coated side of the backing strip, wherein the first hot melt adhesive stripe is located away from the edges of the strip and the first hot melt adhesive stripe runs substantially from one end of the strip to the other end of the strip about the long axis of the strip; and at least two second hot melt flap adhesive stripes coated on a coated side of the backing strip wherein the second adhesive stripes are located in areas other than those covered by the first adhesive stripe; and A book page tape binding process comprising:

applying the above mentioned binding tape to a plurality of sheets with heat.

These and other embodiments of the present invention are illustrated herein.

IN THE DRAWINGS

Figure 1:
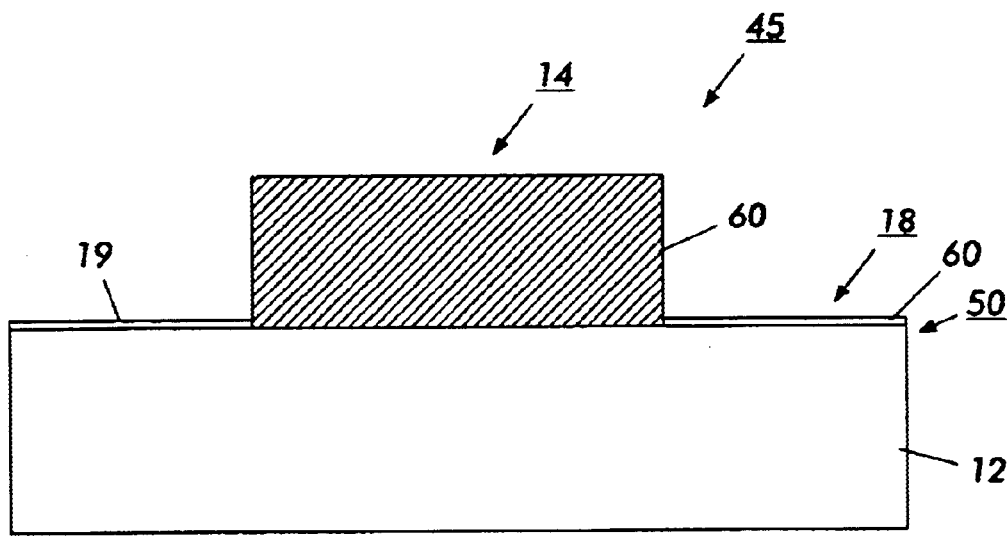
FIG. 1 illustrates a cross sectional view of the improved moisture proof thermally actuated binding tape.

FIG. 1 is a cross sectional view of the improved moisture proof thermally actuated binding tape of the present invention in which the spine adhesive is a non-hygroscopic adhesive.

Referring to FIG. 1, the improved moisture proof thermally actuated binding tape of the present invention, designated generally by the numeral 45, utilizes a non-hygroscopic adhesive 60 having a very low moisture absorbing capacity for the stripe 14 of spine adhesive. Non-hygroscopic adhesive 60 absorbs approximately ⅕ the moisture of prior art spine adhesives, effectively preventing the accumulation of moisture in the adhesive during storage or exposure to high humidity environments. One suitable non-hygroscopic adhesive is adhesive formulation Uni-Rez® 2616 of Arizona Chemical Company, Bridgewater, N.J.

Additionally, the use of non-hygroscopic adhesive 60 for central stripe 14 of binding tape 45 has enabled the thickness of the layer of adhesive 60 to be reduced to approximately 0.019 inches. This provides faster heating during the binding process and a reduction in the amount, and hence the cost, of the adhesive used.

In an embodiment, the loose pages comprising the book are placed, spine edge first on binding tape 45. Sides 18 are turned upwardly to bring the adhesive comprising side stripes 19 into contact with the outside pages or covers of the book. Heat and pressure may then be applied, either simultaneously or in stages, to the bottom and sides of backing strip 12 to activate, i.e., melt, the adhesives 60 and bind the pages of the book to one another and to backing strip 12.

The application of heat and pressure to the bottom of backing strip 12 activates the spine adhesive 60, the relatively large quantity of adhesive that comprises the stripe 14 of adhesive flowing or wicking between and among the edges of the book pages and being absorbed intimately therewith to bond the pages together to one another and to backing strip 12. The application of heat and pressure to sides 18 of strip 12 activates the adhesive 19 to establish a tight bond between the sides 18 of strip 12 and the outer pages or covers of book. This prevents sides 18 from unfolding away from the outer pages or covers of book when the source of heat and pressure is removed and the binding is completed.

Because of the non-hygroscopic nature of spine adhesive 60, little if any moisture accumulates during shipment and storage of the tape prior to use. As a result, small if any quantities of steam are generated during the binding process, resulting in an improved binding. And since the use of non-hygroscopic adhesive 60 permits the thickness of stripe 14 to be reduced, a reduction in the amount of adhesive used is achieved as well.

Use of low tack adhesive for side stripes 19 reduces the amount of heat or thermal energy required to activate adhesive which in turn reduces or eliminates any steam that might be generated from moisture accumulated by the adhesive. And, any steam generated as a result of moisture in backing strip 12 is prevented from passing into the adhesives 60 by the moisture barrier 50, and instead remains trapped within the backing strip.

Figure 2:
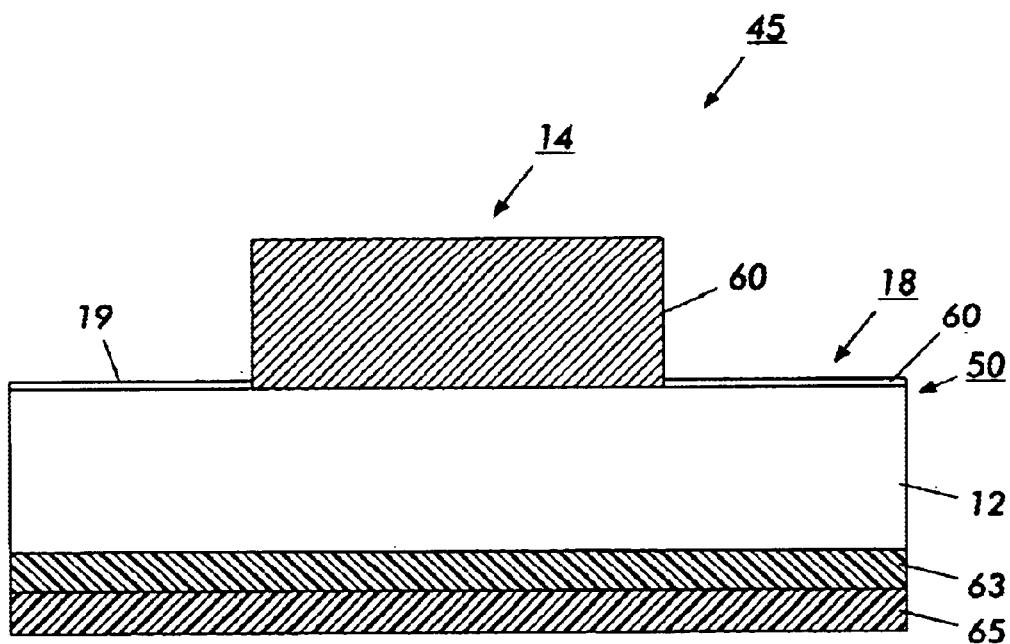
FIG. 2 illustrates a cross sectional view of the improved moisture proof thermally actuated binding tape showing the backing strip 12 with an optional second latex coating 63 and an optional aluminum backing layer 65.

FIG. 2 is a cross sectional view of the improved moisture proof thermally actuated binding tape of the present invention in which the spine adhesive is a non-hygroscopic adhesive and also illustrating an optional second latex coating 63 and an optional aluminum backing layer 65.

Although the invention has been described with respect to embodiments, it is not intended to be limited thereto but rather those skilled in the art will recognize that variations and modifications including equivalents, substantial equivalents, similar equivalents and the like may be made therein which are within the spirit of the invention and the scope of the claims.

DETAILED DESCRIPTION OF THE INVENTION

The binding compositions, articles, and processes of the present invention may be used with advantage in a variety of copying and printing applications.

An aspect of the present invention is that the improved binder tape composition and article can be prepared and economically used without the need for a conventional foil backing layer which foil backing layer in prior art binder tapes functioned as a moisture barrier to permit proper application and stability of the tape in binding applications. By eliminating the foil constituent from the binder tape there is realized considerable operational economies including cost reductions and savings.

The material costs associated with employing and disposing of the foil backing layer, for example, the foil binder tape of the other inventions required additional protective packaging such as a moisture proof polyethylene bag;

the operational costs of applying the foil layer to the tape in tape manufacture; and the use of lower cost substitute adhesive compositions.

In embodiments, the present invention provides a binding tape for application to the spine of a book to bind pages of said book together.

A binding tape comprising:

a coated backing strip;

a first hot melt spine adhesive stripe coated on a coated side of the backing strip, wherein the first hot melt adhesive stripe is located away from the edges of the strip and the first hot melt adhesive stripe runs substantially from one end of the strip to the other end of the strip about the long axis of the strip; for example, at the center and at least two second hot melt flap adhesive stripes coated on a coated side of the backing strip wherein the second adhesive stripes are located in areas other than those covered by the first adhesive stripe.

For application to the spine of a book to bind pages of said book together, said tape is free of any metallic foil. The backing strip of the coated backing strip is a flexible sheet material. The flexible sheet is paper. The flexible sheet is plastic. The flexible sheet is cloth. The flexible sheet is a hygroscopic or non-hygroscopic material of paper, partially hydrolyzed vinyl acetate, cellulose, cloth fabric, or plastic, and mixtures thereof the coating on the coated backing strip is coated on at least one side with a moisture resistant latex. The coating on the coated backing strip is coated on both sides with a moisture resistant latex. The moisture resistant latex comprises a polyacrylic. The first hot melt spine adhesive is poly(ethylvinyl acetate).

The first hot melt spine adhesive is selected from the group consisting of ethylene and vinyl acetate copolymers and equivalent copolymers, partially hydrolyzed ethylene and vinyl acetate copolymers and equivalent copolymers, ethyl vinyl alcohol polymers and copolymers, partially hydrolyzed vinyl acetate polymers, polyacrylate polymers and copolymers, polyamide polymers and copolymers, polyacrylamide polymers and copolymers and mixtures and copolymers thereof.

The second hot melt flap adhesive is polyamide resin, such as UNI-REZ® 2616 commercially available from ARIZONA CHEMICAL CO., which material specifics are a trade secret but generically includes a fatty acid dimer-based polyamide resin.

> or alternatively, commercially available from National Starch and Chemical Company The first hot melt spine adhesive covers the middle of the backing strip and the flap adhesive covers areas of the backing strip from the middle areas covered by the spine adhesive to the edges of the backing strip.

The thickness of the first hot melt spine adhesive as a resin coating is from about 17 mils to about 24 mils prior to thermal activation and binding.

The thickness of the second hot melt flap adhesive as a resin coating is from about 1.6 mils to about 6.4 mils.

> A book page tape binding process comprising:
> applying the binding tape in accordance with claim 1 to a plurality of sheets with heat.
> the heat is at from about 200° F. to about 450° F. further comprising applying the tape with pressure.

The flexible coated sheet material can be, for example, on one or more papers, one or more plastics, and the like materials. A preferred flexible coated sheet material, in embodiments is coated paper. For example, the coated paper can be comprised of a flexible paper strip and a coating thereover. The coating can be any suitable coating, for example, latex, urethane and mixtures thereof.

The flexible coated sheet material, depending on the application and cost considerations, can be a hygroscopic or a non-hygroscopic material, such as partially hydrolyzed vinyl acetate, cellulose, cloth fabric, and mixtures thereof, and optionally the tape material can have a textured or embossed appearance.

The hot melt adhesive can be any suitable adhesive with a heat activation range above about 100° C., for example, ethyl vinyl alcohol polymers and copolymers, partially hydrolyzed vinyl alcohol polymers and copolymers, polyacrylate polymers and copolymers, polyamide polymers and copolymers, polyacrylamide polymers and copolymers. A preferred hot melt adhesive is copoly (ethylene-vinyl acetate) available from National-Starch and Chemical Co.

The thickness of the adhesive as a resin coating can be for example, from about 15 mils to about 24 mils, such as, from about a 15,000$^{th}$ of an inch to about a 24000$^{th}$ of an inch, preferably from about 17000$^{th}$ of an inch to about 21,000$^{th}$ of an inch, and more preferably from about 18,000$^{th}$ of an inch to about 20,000$^{th}$ of an inch. In embodiments the adhesive can be two adjacent and segregated adhesive bands where the two adhesives can be the same or different adhesive formulation. Preferably the two adhesives are different in their adhesive properties.

By varying the adhesive properties of the two adjacent and segregated adhesive bands there can be formulated a binding tape system which achieves excellent adhesion for both of the applications. The spine adhesive has to penetrate the paper and attach to the fibers which requires better flow characteristics that the flap adhesive does not require. The flap adhesive only needs to become tacky and attach the first and last page of the bound book and has much more surface area to achieve this adhesion.

The segregated adhesives can be, for example, a spine adhesive and a flap adhesive. Flap and spine are terms associated with the binding art and refer to those portions of the binding tape that cover a portion the front and back cover sheets, and the edges of the bound or bundled sheets, respectively. The flap adhesive covers the backing strip in the areas other than those areas covered by the spine adhesive.

The spine adhesive is intended to contact and bind the bundled sheet edges with the backing strip whereas the flap adhesive is intended to contact and bind the front and back cover sheets with the backing strip adjacent to the spine area.

The application of the binding tape to the plurality of sheets an be accomplished with, for example, the application of dry heat, moist heat, pressure, and the like methods. The heating can be from about 250° F. to about 450° F., and can be accomplished by any suitable means, such as a binding iron or press. The heating can liberate polar constituents contained in the adhesive and the flexible sheet coating, for example, entrapped or adsorbed moisture, adhesive monomer or volatile oligomers, and the like constituents or residual impurities in the formulated binder tape.

The resulting foil-less binder tape possesses a tape or paper substrate and a thermally activated or hot melt adhesive layer. The adhesive layer can have a substantially uniform thickness and provides excellent tape coating and adhesion properties between the binder tape and the bound sheets.

In an illustrative example, when the adhesive coating resin is a polyacrylate, such as polymethylmethacrylate there is produced a modified resin coated tape that is highly resistant to the effects of moisture. The thickness of the adhesive resin can be from about 17 mils to about 24 mils. The thickness unit mils is equivalent to one thousandth, 0.001, of an inch.

In embodiments the adhesive resin coated tape can be prepared, for example, in a known batch-wise or continuous processes. The foil-less paper is unwound on a coating machine and run through a die coating head that deposits the flap adhesive on the web and controls both the thickness and the width of the adhesive which is deposited, for example, in the form one or several streams or ribbons of adhesive or glue. The glue is permitted to cool, at rest or while being conveyed to a second die coating head that deposits a second adhesive, or the so-called spine adhesive. The spine adhesive is deposited or coated in between the previously coated flap adhesive streams or ribbons substantially in the middle of the paper tape. The cooled paper tape bearing both adhesives can be used directly or can be wound up into rolls for later binding operations. The wound up rolls can be optionally slit to produce multiple reels of binder tape from a single roll of coated paper. The adhesive resin coating can be any suitable material which provides the requisite binding properties and can withstand the elevated temperatures of the binder tape application of the present invention.

Examples of suitable hot melt adhesive resin coatings include polyamides, copoly (ethylene-vinyl acetate), paraffin, and the mixtures thereof Preferred classes of materials include polyamides, copoly(ethylene-vinyl acetate), and the like materials.

The total weight of the adhesive resin coating can be from about 1 to about 40 weight percent of the total weight of the coated binder tape.

Illustrative examples of adhesive resins suitable for combination with the binder tape of the present invention include copoly(ethylene-vinyl acetate) polymers and copolymers, branched styrene acrylates, styrene methacrylates, styrene butadienes, vinyl resins, including linear and, branched homopolymers and copolymers of two or more vinyl monomers; vinyl monomers include styrene, p-chlorostyrene, butadiene, isoprene, and myrcene; vinyl esters such as esters of monocarboxylic acids including methyl acrylate, ethyl acrylate, n-butyl acrylate, isobutyl acrylate, dodecyl acrylate, n-octyl acrylate, phenyl acrylate, methyl methacrylate, ethyl methacrylate, and butyl methacrylate; acrylonitrile, methacrylonitrile, acrylamide; and the like. In embodiments adhesives resins include styrene butadiene copolymers, and mixtures thereof. There can also be blended with the adhesive of the present invention other additives to impact performance and or aesthetic characteristics to the binder adhesive or the resulting bound documents including flow aid additives, colloidal silicas, such as AEROSIL®, metal salts and metal salts of fatty acids inclusive of zinc stearate, aluminum oxides, cerium oxides, and mixtures thereof, which additives are generally present in an amount of from about 0.1 percent by weight to about 10 percent by weight, and in embodiments in an amount of from about 0.1 percent by weight to about 5 percent by weight. Several of the aforementioned additives are illustrated in U.S. Pat. Nos. 3,590,000 and 3,800,588, the disclosures of which are totally incorporated herein by reference.

The invention will further be illustrated in the following non limiting Examples, it being understood that these Examples are intended to be illustrative only and that the invention is not intended to be limited to the materials, conditions, process parameters, and the like, recited herein. Parts and percentages are by weight unless go otherwise indicated.

EXAMPLE I

Foil-Less Binder Tape Preparation

A paper tape, such as acrylic latex saturated paper or "book binding tape" commercially available from Kimberly-Clark Corporation was selected as the backing sheet or backing substrate for the foil-less binder tape. The paper tape had a moisture content of from about 1 to about 3 weight percent at the time of manufacture and can optionally contain a colorant or tinting agent. The paper tape was uniformly coated on one or both sides of the backing sheet with an acrylic latex to form a vapor and moisture barrier. The latex barrier prevents the hot melt adhesive from bubbling when the adhesive is heated and applied to the paper binder tape or when the fully formulated foil-less binder tape is applied to bundled paper sheets in a binding operation or whenever heating the paper liberates water vapor. The latex coated paper binder tape can be spooled up and later unwound for coating application of the hot melt adhesive and again during the application of the fully formulated foil-less binder during binding operations. For the adhesive coating application the latex coated paper was unwound on a coating machine that was capable of continuous operation and included flying splines and a dancer system that provided precise tension control over the latex coated paper. Hot melt adhesives were step-wise applied to the latex coated paper web by passing the web firstly through a die coating head to deposit two separated, that is non-adjacent but parallel streams of the so-called flap adhesive near the edges of the paper web. The deposited flap adhesive streams or ribbons were able to cool before the web reached and was secondly passed through a second die coating head to deposit the so-called spine adhesive stream or ribbon substantially in the middle of the paper web and between the foregoing flap adhesive streams. The web was cooled to allow the spine adhesive harden. The thickness and the width of the spine adhesive coat layer was also controlled from about 0.615 to about 0.651 inches to maintain coating quality and performance specifications. The width of the flap was from about 0.29 to about 0.34 inches. The paper web with both flap adhesive coating streams and the spine adhesive coating stream therebetween was taken up on web take up roll. The take up roll can optionally be appropriately subdivided with a slitter to provide multiple reels of binder tape sourced from a single jumbo roll of coated paper. For example, a jumbo roll feed was slit through its diameter-wise dimension to produce 8 initial reels and thereafter each resulting reel was again subdivided by slitting diameter-wise to produce 9 reels for a total of 72 reels.

EXAMPLE II

Foil-Less Binder Tape Application—Binding Procedure

A tilt bed and a binder assembly cooperate to produce a bound book. A single spine heater and two flap heaters are activated and thermally equilibrated at operating temperatures of about 218° C. (435° F.) for the spine heater, and about 129° C. (285° F.), for the flap heaters, respectively. In a Xerox Model 5090®, when "start print" condition was selected a tilt bed rotates counterclockwise to the horizontal loading position. Next, set support fingers move down and out of the paper path, and the set transport moves towards a group of bindexers. The bindexers clamp the set of copy sheets, and moves the set of copy sheets from the bindexers, and then position the stack of copy sheets on the tilt bed. The set is clamped by the tilt bed clamp and the tilt bed rotates clockwise. After the tilt bed reaches a vertical registration position, the flap regions on the binder tape are mechanically raised to form a bucket or "U"-shaped trough configuration to ensure that the paper set remains close to the spine heater. The tilt bed clamps open to an opening proportional to the size of the number of copy sheets of the set, and allows the set of copy sheets to drop onto the spine heater. The clamp opening is controlled by a three-step mechanical stop that sets itself as the tilt bed rotates clockwise to the registration position. A two level vibrator is turned-on to register the set of copy sheets to the front of the spine heater and against the registration pin on the tilt bed. A set registration guide, for example, a flat spring, also gently presses the set of copy sheets against the registration guide pin during vibration. The set of copy sheets is clamped by the tilt bed clamps and binder calipers to force out any air between the sheets, and to support the lower portion of the set at the spine, and then the set is raised above the spine heater. During the above operation, a piece of binder tape, cut to the required length, moves under the set of copy sheets and on top of the spine heater. The tilt bed lowers the set of copy sheets onto the tape and the set of copy sheets is ready for binding. The binder calipers are retracted and the flap, or side portion, of the tape and is moved into position on either side of the page set by the flap heaters. Heat and pressure are simultaneously applied to the spine and flaps of the binder tape to affix the tape to the set of copy sheets as a binder. After a period of time, which can depend upon, for example, the number of sheets being bound, the binding is complete. The tilt bed clamps the bound set of copy sheets and the tilt bed rotates counterclockwise to place the bound set of copy sheets in the unload position so a bound set transport can thereafter move the set to an output stacker.

While this invention has been described in conjunction with the specific embodiments described above, other modifications, alternatives, and variations of the present invention may occur to one of ordinary skill in the art based upon a review of the present application and these modifications, including equivalents, substantial equivalents, similar equivalents and the like thereof, are intended to be included within the scope of the present invention. Accordingly, the specific embodiments of the invention, as set forth above, are intended to be illustrative not limiting.

What is claimed is:

1. A binding tape comprising:

a coated backing strip;

a first hot melt spine adhesive stripe coated on a coated side of the backing strip, wherein the first hot melt adhesive stripe is located away from the edges of the strip and the first hot melt adhesive stripe runs substantially from one end of the strip to the other end of the strip about the long axis of the strip; and at least two second hot melt flap adhesive stripes coated on a coated side of the backing strip wherein the second adhesive stripes are located in areas other than those covered by the first adhesive stripe; and a moisture resistant latex coating on at least one side of the backing sheet wherein said binding tape is free of metallic foil.

2. A tape in accordance with claim 1, wherein the backing strip of the coated backing strip is a flexible sheet material.

3. A tape in accordance with claim 2, wherein the flexible sheet is paper.

4. A tape in accordance with claim 2, wherein the flexible sheet is plastic.

5. A tape in accordance with claim 2, wherein the flexible sheet is cloth.

6. A tape in accordance with claim 1, wherein the coating on the coated backing strip is coated on both sides with a moisture resistant latex.

7. A tape in accordance with claim 1, wherein the moisture resistant latex comprises a polyacrylic.

8. A tape in accordance with claim 1, wherein the first hot melt spine adhesive is poly(ethylvinyl acetate).

9. A tape in accordance with claim 1, wherein the first hot melt spine adhesive is selected from the group consisting of ethylene and vinyl acetate copolymers, partially hydrolyzed ethylene and vinyl acetate copolymers, ethyl vinyl alcohol polymers and copolymers, partially hydrolyzed vinyl acetate polymers, polyacrylate polymers and copolymers, polyamide polymers and copolymers, polyacrylamide polymers and copolymers.

10. A tape in accordance with claim 1, wherein the second hot melt flap adhesive is polyamide resin.

11. A tape in accordance with claim 1, wherein the first hot melt spine adhesive covers the middle of the backing strip and the flap adhesive covers areas of the backing strip from the middle areas covered by the spine adhesive to the edges of the backing strip.

12. A tape in accordance with claim 1, wherein the thickness of the first hot melt spine adhesive as a resin coating is from about 17 mils to about 24 mils.

13. A tape in accordance with claim 1, wherein the thickness of the second hot melt flap adhesive as a resin coating is from about 1.6 mils to about 6.4 mils.

14. A tape in accordance with claim 1, wherein the width of the spine adhesive coat layer is from about 0.615 to about 0.651 inches.

15. A tape in accordance with claim 1, wherein the width of the flap is from about 0.29 to about 0.34 inches.

16. A book page tape binding process comprising:

applying the binding tape in accordance with claim 1 to a plurality of sheets with heat.

17. A process in accordance with claim 16, wherein the heat is at from about 200° F. to about 450° F.

18. A process in accordance with claim 16, further comprising applying the tape with pressure.

* * * * *